(12) United States Patent
Calio et al.

(10) Patent No.: US 8,867,819 B2
(45) Date of Patent: Oct. 21, 2014

(54) INFORMATION TECHNOLOGY ASSET LOCATION USING VISUAL DETECTORS

(71) Applicant: International Business Machines Corporation, Armonk, NY (US)

(72) Inventors: Robert J. Calio, Red Hook, NY (US); Jonathan H. Connell, II, Cortlandt-Manor, NY (US); Michael J. Frissora, Wappingers Falls, NY (US); Canturk Isci, West New York, NJ (US); Jeffrey O. Kephart, Cortlandt-Manor, NY (US); Jonathan Lenchner, North Salem, NY (US); Suzanne K. McIntosh, Hawthorne, NY (US); Iqbal I. Mohomed, Stamford, CT (US); John C. Nelson, Newtown, CT (US); James W. Thoensen, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/751,269

(22) Filed: Jan. 28, 2013

(65) Prior Publication Data

US 2014/0211983 A1    Jul. 31, 2014

(51) Int. Cl.
    *G06K 9/00*    (2006.01)
    *G06K 9/36*    (2006.01)

(52) U.S. Cl.
    CPC ................... *G06K 9/00624* (2013.01)
    USPC .......................................... 382/153; 382/291

(58) Field of Classification Search
    USPC .................................................. 382/153, 291
    See application file for complete search history.

(56) References Cited

U.S. PATENT DOCUMENTS

| | | | |
|---|---|---|---|
| 5,499,306 A * | 3/1996 | Sasaki et al. | 382/291 |
| 6,877,297 B2 | 4/2005 | Armington et al. | |
| 7,295,114 B1 | 11/2007 | Drzaic et al. | |
| 8,010,565 B2 | 8/2011 | Gujarathi et al. | |
| 8,134,471 B2 | 3/2012 | Bristow et al. | |
| 2007/0141895 A1* | 6/2007 | Karstens | 439/490 |
| 2009/0198371 A1* | 8/2009 | Emanuel et al. | 700/226 |
| 2010/0027894 A1* | 2/2010 | Dahari | 382/218 |
| 2010/0082178 A1 | 4/2010 | Dawson et al. | |
| 2011/0210167 A1 | 9/2011 | Lyon | |

OTHER PUBLICATIONS

Das, Rajarshi et al., "Automated Object Classification Using Temperature Profiles", filed May 18, 2012, U.S. Appl. No. 13/475,086.

(Continued)

*Primary Examiner* — Alex Liew

(74) *Attorney, Agent, or Firm* — Stephen J. Walder, Jr.; William Stock

(57) ABSTRACT

Mechanisms are provided for determining the physical location of a physical asset in a physical area. A plurality of physical assets are controlled to cause each physical asset to output a visual output pattern on visual output elements of the physical asset. An image of a target physical asset is captured that has the current state of the visual output elements. An identification of the target physical asset is determined based on the current state of the visual output elements. A physical location of the target physical asset is determined based on a physical location of the image capture device when the image was captured. Location data identifying the determined physical location of the target physical asset is stored in an asset database in association with configuration information for the physical asset.

17 Claims, 9 Drawing Sheets

(56) References Cited

OTHER PUBLICATIONS

Das, Rajarshi et al., "Automated Object Classification Using Temperature Profiles", filed Sep. 13, 2012, U.S. Appl. No. 13/613,270.
Das, Rajarshi et al., "Location of Computing Assets within an Organization", filed Jul. 2, 2012, U.S. Appl. No. 13/540,122.
U.S. Appl. No. 13/751,451.
Brey, T. et al., "BladeCenter chassis management", IBM J. Res. & Dev., vol. 49, No. 6, Nov. 2005, pp. 941-961.
Brignone, Cyril et al., "Real time asset tracking in the data center", Distributed and Parallel Databases, vol. 21, Issue 2-3, published online May 9, 2006, 21 pages.
Holland, J.M. et al., "MDARS Interior Platform", Association of Unmanned Vehicle Systems, Washington, DC, Jul. 10-12, 1995, 13 pages.
Jyothsnaa, S. et al., "Automated Inventory Management and Security Surveillance System Using Image Processing Techniques", TENCON 2010-2010 IEEE Region 10 Conference 2010, pp. 2318-2321.
Kuhn, Michael et al., "Real-time UWB Indoor Positioning System with Millimeter 3-D Dynamic Accuracy", IEEE, Antennas and Propagation Accuracy Society International Symposium (APSURSI'09), 2009, 4 pages.
Lenchner, Jonathan et al., "Towards Data Center Self-Diagnosis Using a Mobile Robot", Proceedings of the 8th International Conference on Autonomic Computing (ICAC'11), Jun. 14-18, 2011, 10 pages.
Mansley, Chris et al., "Geometric Aspects of Robotic Mapping and Monitoring of Data Centers", Fall Workshop on Computational Geometry, Stony Brook, Oct. 2010, 4 pages.
Mansley, Chris et al., "Robotic Mapping and Monitoring of Data Centers", 2011 IEEE International Conference on Robotics and Automation (ICRA'11), Shanghai International Conference Center, May 9-13, 2011, pp. 5905-5910.
Udar, N. et al., "Asset Localization in Data Centers Using WUSB Radios", A. Das et al. (Eds.): Networking 2008, LNCS 4982, 2008, pp. 756-767.
Yang, Bo et al., "Hotspot Diagnosis on Logical Level", 7th International Conference on Network and Service Management (CNMS), 2011, 5 pages.

\* cited by examiner

US 8,867,819 B2

INFORMATION TECHNOLOGY ASSET LOCATION USING VISUAL DETECTORS

BACKGROUND

The present application relates generally to an improved data processing apparatus and method and more specifically to mechanisms for information technology asset location using visual detectors.

With the increasing miniaturization of information technology (IT) equipment, data centers and large organizations today contain more IT assets, e.g., storage systems, computing devices, communications equipment, and the like, than ever before. Large data centers, for example, may house hundreds of thousands of physical IT assets. A common problem in data centers and large organizations is keeping track of the exact locations of all of these IT assets.

One solution for keeping track of the location of IT assets in data centers and large organizations is to use passive or active radio frequency identifier (RFID) tags on the IT assets and then manually scan the RFID tags with RFID readers. However, with this solution, all IT assets need to have their own associated RFID tag and the tags must be manually read by a corresponding RFID reader. This leads to significant labor and material costs associated with these operations. In addition, manual scanning and tracking of IT assets is error-prone due to the influence of human error, and the location information gathered through manual means can frequently become out of date with respect to the actual current IT asset location.

SUMMARY

In one illustrative embodiment, a method, in a data processing system, is provided for determining the physical location of a physical asset in a physical area. The method comprises controlling a plurality of physical assets to cause each physical asset to output a visual output pattern on one or more visual output elements of the physical asset. The method further comprises capturing at least one image of a target physical asset using an image capture device. The at least one image comprises a current state of the one or more visual output elements of the target physical asset. The method comprises determining an identification of the target physical asset based on the current state of the one or more visual output elements of the target physical asset. The method also comprises determining a physical location of the target physical asset based on a physical location of the image capture device when the at least one image of the target physical asset was captured. Furthermore, the method comprises storing location data identifying the determined physical location of the target physical asset in an asset database in association with configuration information for the physical asset.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
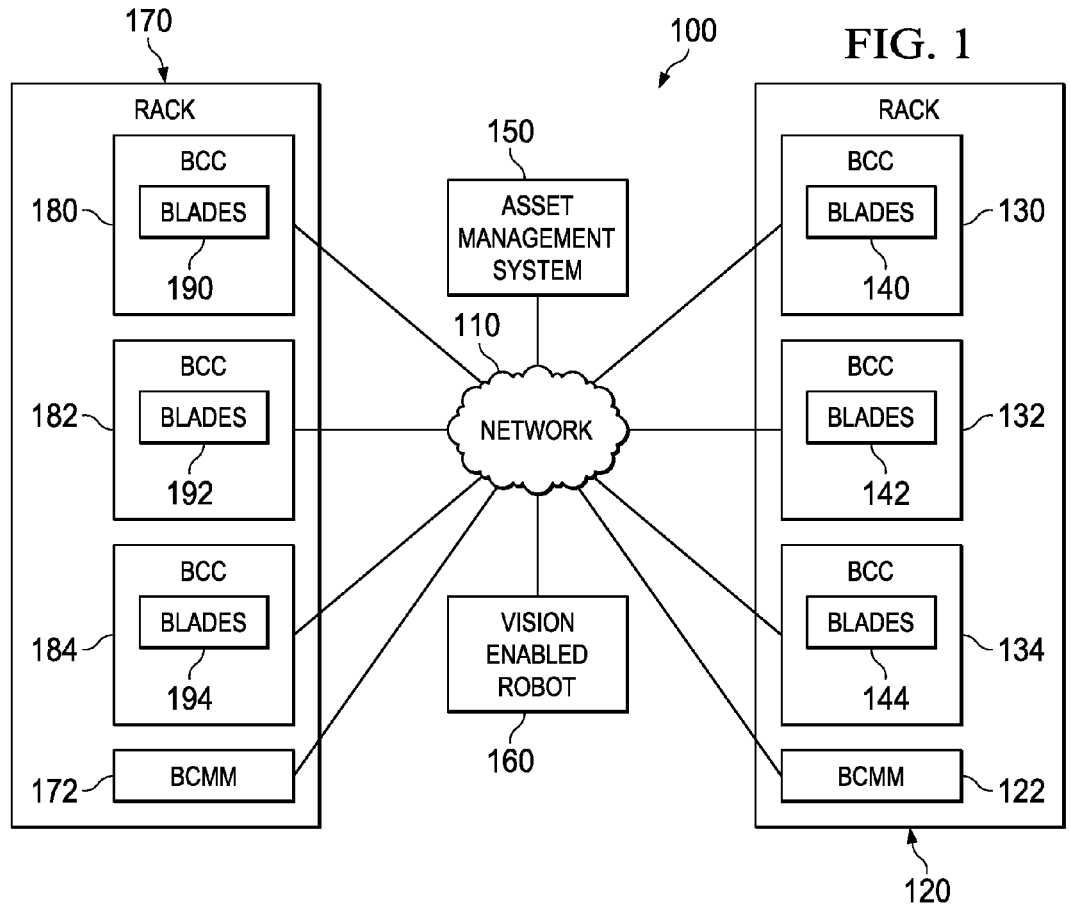
FIG. 1 is an example diagram of a distributed data processing system in which aspects of the illustrative embodiments may be implemented.

The illustrative embodiments provide mechanisms for locating assets, such as information technology (IT) assets or other types of assets, in the physical premises of an organization, such as a data center, office building, or other physical location having a plurality of assets deployed within the physical location. The mechanisms of the illustrative embodiments utilize visual detectors for identifying the locations of assets without having to employ separate identifier mechanisms attached to or associated with the assets. To the contrary, the mechanisms of the illustrative embodiments utilize the existing display elements of the assets, housings or racks in which the assets are located, or the like, to signal to the visual detectors the presence of the asset when the visual detectors are in a proper location to detect the presence of the asset, as will be described in greater detail hereafter. These visual detectors may be present on portable/mobile devices, such as automated robotic devices, portable hand-held devices operated by users, or the like. Moreover, the visual detectors may be stationary but able to be reoriented to focus on different portions of a physical location, such as in the case of a room-mounted camera, or the like.

One principle implementation of the illustrative embodiments is in the use of the mechanisms of the illustrative embodiments to locate IT assets within a data center. More specifically, the mechanisms of the illustrative embodiments may be utilized to identify blade center chassis in racks of the data center using a visual detection mechanism provided in a portable and/or mobile unit. Blade centers chassis (or simply blade centers), there associated blades, and racks for holding such blade center chassis are generally known in the art and thus, a more detailed explanation is not provided herein. In one illustrative embodiment, the portable and/or mobile unit is a vision-enabled robot that has visual sensors, e.g., digital cameras, for detecting an environment of the robot. An example of such a vision-enabled robot with which the mechanisms of the illustrative embodiments may be utilized is described in "Robotic Mapping and Monitoring of Data Centers," Proceedings of the International Conference on Robotics and Automation (ICRA 2011), which is hereby incorporated by reference.

It should be appreciated that while the illustrative embodiments will be described in terms of the location of IT assets within a data center using a vision-enabled robot, the present invention is not limited to such. Rather, the present invention is primarily directed to the use of visual detectors to detect a visual output pattern associated with IT assets of an organization such that the visual output pattern may be recognized as identifying the IT assets and their location to a management system. As such, the illustrative embodiments may include implementations in any organization and may make use of any vision sensors or detectors capable of detecting visual displays or outputs associated with IT assets. Such visual detectors may be stationary, portable moveable by way of a manual process, or mobile, such as through automated mechanisms, e.g., robots or other automated devices.

Moreover, it should be appreciated that while the illustrative embodiments will be described in terms of the location of blade center chassis in racks of a data center, the illustrative embodiments are not limited to such. Rather, the illustrative embodiments may be used with any type of asset having controllable visual indicators. Such assets may include, for example, power supplies, storage devices, rack mounts themselves, air conditioning units, or any of a plethora of other physical assets that have visual indicators that can be controlled such that a visual detector can be used to detect the presence of the physical asset. Applicability of the illustrative embodiments to other types of physical assets will be apparent to those of ordinary skill in the art in view of the present description.

For purposes of the following description, it will be assumed for illustration purposes only, that the visual detectors are digital cameras mounted on or integrated with automated robotic mechanisms, such as that described in the reference "Robotic Mapping and Monitoring of Data Centers" mentioned above. It will further be assumed for illustration purposes, that the IT assets whose location is being determined are IT assets associated with blade centers of a data center organization. Using the data center and a mobile vision-enabled robot as an example implementation of the illustrative embodiments of the present invention, the mobile vision-enabled robot is used in conjunction with software running inside a blade center management module (BCMM) of a blade center chassis with the software running inside the BCMM controlling the visual output generated by display elements or visual indicators, e.g., light emitting diodes (LEDs), lights, or the like, on the blade center chassis and/or IT assets located within the blade center chassis, e.g., the blades in the blade center chassis.

The illustrative embodiments may make use of the BCMM's ability to make lights, LEDs, or the like, on the blade center chassis and/or IT assets blink or illuminate in a defined pattern that can be recognized by the vision-enabled robot. The illustrative embodiments further may make use of the vision-enabled robot's ability to process images extremely accurately, at least in so far as ascertaining whether lights, LEDs, or the like, at given locations are either turned on or off The illustrative embodiments may further use some of the lights, LEDs, or the like on the assets to build additional error correction schemes to improve the detection accuracy of the defined patterns. With such abilities, the BCMM can, in effect, spell out precisely what IT assets are contained in its associated blade center chassis using a binary blinking pattern that is described in greater detail hereafter. The information thus obtained by the vision-enabled robot can be provided to a centralized asset management system to keep such IT asset location information up-to-date in an automated manner.

With the automated vision-enabled robot implementation, a large monetary savings in labor and equipment costs can be realized while achieving a highly accurate and reliable up-to-date tracking of physical assets within a physical location, such as IT assets within a data center or other organization. No human labor is necessary on a day-to-day basis to manage the locations of these physical assets. Human technicians can add and remove assets, e.g., blade servers or the like, at will and, as long as the automated vision-enabled robot performs a scan of the physical assets on a routine basis, the current locations of these physical assets can be accurately maintained by the centralized asset management system. Furthermore, the mechanisms of the illustrative embodiments achieve the ability to locate physical assets using already existing visual output or display elements of the physical assets and do not require any additional hardware elements, such as RFID tags and readers, for example.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an example block diagram of a distributed data processing system in which aspects of the illustrative embodiments may be implemented. As shown in FIG. 1, the distributed data processing system may be a distributed data processing system of an organization, such as a data center or the like, having a plurality of computing system resources coupled to one another via one or more data networks 110. These one or more data networks 110 may comprise one or more wireless communication network through which data may be communicated between computing systems and/or one or more wired data communication networks. These networks may comprise one or more wired/wireless local area networks (LANs), one or more wired/wireless wide area networks (WANs), or the like.

The one or more data networks 110 communicatively couple the computing system resources of the distributed data processing system to one another. These computing system resources, in the depicted example, include one or more racks 120 and 170, an asset management system 150, and a vision enabled mobile computing platform 160, which in the depicted example is an automated robot equipped with a vision sensor/detector, such as one or more digital cameras for example. The automated robot may be of a type such as described in "Robotic Mapping and Monitoring of Data Centers," Proceedings of the International Conference on Robotics and Automation (ICRA 2011), for example. Of course other types of automated robotic platforms may be utilized without departing from the spirit and scope of the illustrative embodiments.

The distributed data processing system 100 further comprises a plurality of computing system resources, or information technology (IT) assets, which may be managed by the asset management system 150 via the network 110. In the depicted example, these assets include a plurality of racks of IT assets 120 and 170. Each of the racks 120 and 170 may comprise one or more blade center chassis 130-134 and 180-184. Each of the blade center chassis 130-134 and 180-184 may comprise one or more blades 140-144 and 190-196. While the illustrative embodiment will be described with regard to the identification of the location of blade centers chassis 130-134, 180-184 of a rack 120, 170 and blades 140-144, 190-194 within blade center chassis 130-134, 180-184, the illustrative embodiments are not limited to such. Rather, the illustrative embodiments may be utilized to identify the location of any physical asset or computing system resource (IT asset) having associated visual output devices that can be used to visually communicate information to a visual sensor/detector of the vision enabled automated robot 160, without departing from the spirit and scope of the illustrative embodiments.

The racks 120 and 170 may have associated blade center management modules (BCMMs) 122 and 172 that provide hardware and software for managing the IT assets, e.g., the blade center chassis 130-134 and 180-184, and blades 140-144 and 190-194. There may be a single BCMM for the entire rack 120 or 170, or a separate BCMM for each blade center chassis 130-134 and 180-184 within the rack 120 or 170. The BCMMs 122, 172 may be associated with the rack 120, 170 or may be integrated with or otherwise associated with the blade center chassis 130-134, 180-184. The BCMMs 122 and 172 communicate with the remotely located asset management system 150 via the network 110 and, based on such communications, may control the operation of the IT assets within the corresponding racks 120 and 170 as well as provide result data back to the asset management system 150. As part of this control, the BCMMs 122 and 172 may control the pattern of output of visual display elements on the IT assets so as to output a desired pattern for detection by a visual sensor/detector of the vision enabled automated robot 160.

The vision enabled automated robot 160 may communicate through a wireless communication link, and the network 110, with the asset management system 150. The asset management system 150 is a computing system comprising hardware and software that is responsible for managing the various computing system resources (IT assets) of the distributed data processing system 100, e.g., the racks 120 and 170, blade center chassis 130-134 and 180-184, and blades 140-144 and 190-196. As part of this management, the asset management system 150 may utilize the automated robot 160 to gather location information for various computing system resources (assets) within the distributed data processing system 100 using the visual sensors/detectors of the automated robot 160. That is, the asset management system 150 coordinates the automated robot 160 and the BCMMs 122 and 172 of the racks 120 and 170, or BCMMs 122, 172 associated with the individual blade center chassis 130-134, 180-184, to achieve the pattern output and detection for identifying the location of IT assets within the distributed data processing system 100.

In operation, the vision enabled automated robot 160 may move throughout the distributed data processing system 100 performing various operations, such as temperature mapping, floorplan mapping, and the like. As the vision enabled automated robot 160 traverses the physical location of the IT assets, the vision enabled automated robot 160 may identify the presence of a rack 120 or 170. That is, the automated robot 160 may have a stored visual pattern indicative of a rack and may determine, based on images captured by the visual detectors/sensors of the automated robot 160 (hereafter referred to as digital cameras for simplicity), when the automated robot 160 is positioned within a close proximity of a rack 120 or 170.

The automated robot 160 communicates, via the network 110, its current location within the premises of the distributed data processing system 100 to the asset management system 150 and an indication that the automated robot 160 has detected the presence of a rack. In response, the asset management system 150 sends control communications to the BCMMs 122 and/or 172 of the rack 120 and/or 170 to instruct the BCMMs 122 and/or 172 to control the visual output pattern of visual output elements of the blade center chassis 130-134 and 180-184 and blades 140-144 and 190-196. These control communications may be transmitted via the network 110 or, in an alternative embodiment, may be transmitted via the automated robot 160 using a localized communication protocol between the automated robot 160 and the BCMMs 122 and/or 172, e.g., Bluetooth, infrared, radio frequency, or other localized communication mechanism.

In response to the receipt of the control communication from the asset management system 150, the BCMMs 122 and/or 172 of the rack 120 and/or 170 sends control signals, via circuitry internal to the rack 120 and/or 170, to the individual blade center chassis 130-134 and 180-184 and blades 140-144 and 190-194 of the corresponding rack120 and/or 170 to control the visual output pattern of the visual output elements of these IT assets. For example, these control signals may instruct the IT assets to either turn on or off their corresponding light emitting diodes (LEDs) on these IT assets. The turning on/off of these LEDs generates a pattern of LEDs that may be detected by the digital camera(s) of the automated robot 160 when the automated robot 160 takes a snapshot of the IT assets.

The asset management system 150 may instruct the automated robot 160 to capture one or more snapshot and/or video images of the IT assets of the rack 120 and/or 170 using its digital camera(s). These snapshots may be of the rack 120, 170 as a whole, or may be focused on individual locations within the rack 120, 170, e.g., areas of the rack 120, 170 where IT assets are expected to be located. The automated robot 160 may perform an initial set of image/video analysis operations to generate a digital image or set of digital images that may be used to identify a detected blade center visual output pattern, e.g., LED pattern, which may be communicated back to the asset management system 150. Alternatively, the raw snapshot/video data may be transmitted to the asset management system 150 which may be configured to include analysis engines for analyzing the raw snapshot/video data to identify the blade center visual output pattern.

The visual output pattern(s) detected by the automated robot 160 based on the control of the visual output elements of the blade center chassis 130-134 and 180-184, and blades 140-144 and 190-194, by the BCMMs 122 and/or 172, in response to control signals from the asset management system 150, may be analyzed to identify the particular locations within the rack 120, 170 of the blade center chassis 130-134 and 180-184, and the individual blades 140-144 and 190-194. That is, the asset management system 150 may cross-reference or correlate the detected visual output pattern with configuration information obtained from the BCMMs 122 and/or 172 to identify the particular IT assets and their particular location. For example, using the detected visual output patterns, the asset management system 150 may determine which vertical position in the rack 120, 170 the particular blade center chassis 130-134 and 180-184 are located, and within each blade center chassis 130-134 and 180-184, which slots are occupied by which ones of the blades 140-144 and 190-194. That is, through known mechanisms, the BCMMs 122 and/or 172 collect configuration information for the blades in the blade center chassis managed by the BCMMs 122 and/or 172. For example, vital product data (VPD) and the like, stored in and associated with the blades of the blade center chassis may be reported to the BCMMs 122 and/or 172 when the blades are inserted into slots of the blade center chassis and/or powered on. Moreover, slot positions within the blade center chassis where such blades are inserted or powered on may likewise be reported to the BCMMs 122 and/or 172.

This configuration information may be used to identify the particular blades and their slot positions within the blade center chassis. The mechanisms of the illustrative embodiments may be used to identify the particular vertical locations and in what racks the particular blade center chassis are located. The location of the automated robot may be used to identify the particular location of the rack. Thus, through the use of the mechanisms of the illustrative embodiments, a complete identification of the location of IT assets within a distributed data processing system may be obtained.

In one illustrative embodiment, in order to identify which blade center chassis are present within a rack of interest, a binary search is performed using the visual output elements of the blades 140-144 and 190-194 of the blade center chassis 130-134 and 180-184 in the racks 120, 170. In another illustrative embodiment, the visual output elements may be used to encode a signature to indicate the identity of the blade centers 130-134 and 180-184. Of course other methodologies for identifying the IT assets within a blade center chassis 120, 170 using visual detectors/sensors and visual output elements of the IT assets may be used without departing from the spirit and scope of the illustrative embodiments.

With the binary search embodiment, the visual output elements of blades 140-144 and 190-194 within half of the blade center chassis locations in the racks 120, 170 may be turned on while the other half are turned off and the automated robot 160 captures an image of the state of the visual output elements. The asset management system 150 may do this with regard to all of the blade centers chassis 130-134, 180-184 in all of the racks 120 and 170 of the distributed data processing system 100, at least a portion of the distributed data processing system 100 that is known to be present in a vicinity of the automated robot 160 reported location, or with regard to only the blade centers chassis within the particular rack 120, 170 that is being viewed by the visual sensors/detectors of the automated robot 160 as determined from the location of the automated robot 160. The half of the blade center chassis that are turned off are then discarded by the asset management system 150 and a new set of blade center chassis consisting of the blade center chassis that were turned on is then halved again and the process repeated until a single blade center chassis in a rack 120, 170 being viewed by the automated robot 160 is identified.

The asset management system 150 knows the identity of the blade center chassis in the distributed data processing system via the BCMMs 122, 172 which report their operational state and the configuration information of the blade center chassis, e.g., the identity of the blade center chassis, the blades within the blade center chassis, and the like, managed by the BCMMs 122, 172 to the asset management system 150, such as when the blade center chassis is made operational, in response to a change in configuration of the blade center chassis, periodically, or the like. While the BCMMs 122, 172 may report their operational state and configuration of the blade center chassis, the BCMMs 122, 172 are not aware of their physical location and thus, cannot communicate this information to the asset management system 150. However, through the binary search method described above, the mechanisms of the illustrative embodiments can determine which of these blade center chassis are in the particular rack 120, 170 being viewed by the automated robot 160 and the particular vertical location (or rack location) of these blade center chassis 130-134, 180-184 in the rack 120, 170. Having identified the blade center chassis and its location within the rack 120, 170, the asset management system 150 may then, through the configuration information obtained from the BCMMs 122, 172 associated with the identified blade center chassis, identify the current slot locations of the blades within the identified blade centers chassis.

This asset location information may be maintained in an asset database associated with the asset management system 150 and used to perform management operations on the particular blade center chassis and blades within the blade center chassis. Thus, using the binary search embodiment of the illustrative embodiments, each of the blade centers chassis in a data center may be identified in $O(\log(n))$ time where n is the number of blade center chassis.

With regard to the encoded signature embodiment, the asset management system may encode each blade center chassis with a unique signature that can be represented in a binary format using an on/off state of visual output elements of blades of the blade center chassis. Thus, for example, if a blade center chassis can hold up to 14 blades, each blade having a single visual output element that can have one of 2 possible states (on/off), then $2^{14}=16,384$ combinations of states of these visual output elements are possible. Thus, 16,384 different blade center chassis may be uniquely identifiable using the visual output elements of the blades of the blade center chassis.

Each blade center chassis is encoded with a signature from [0, 16383], e.g., [$(00000000000000)_2$, $(11111111111111)_2$], where a "0" may be represented by a visual output element of a blade in a corresponding slot of the blade center being turned off and a "1" may be represented by a visual output element of a blade in a corresponding slot of the blade center chassis being turned on. If more than 16,384 blade center chassis are present in the distributed data processing system 100, then signatures may be reused starting from 0 (~signature=blade center no. mod $2^{14}$).

In such an embodiment, in response to the automated robot 160 informing the asset management system 150 of its location and the detected presence of a rack 120, 170 in the vicinity of the automated robot 160, then the asset management system 150 may send a control communication to the BCMMs 122, 172 instructing the BCMMs 122, 172 to control their corresponding blade center chassis to output a signature of the blade center chassis on the visual output elements of their blades. The visual sensor/detector of the automated robot 160 may then capture an image/video of the rack 120, 170 and its corresponding blade center chassis 130-134, 180-184 and thereby identify the signatures of all of the blade center chassis 130-134, 180-184 in the data center as well as the vertical locations of these signatures in the rack 120, 170. This information may be returned to the asset management system 150 for correlation with blade center configuration information to thereby generate the asset location information that may be stored in the asset database associated with asset management system 150.

Using the encoded signature embodiment, the blade centers in a blade center chassis may be identified in $O(1)$ time. For data centers that have less than 16,384 blade center chassis, the identification of the location of all blade center chassis and their corresponding blades may be performed using a single iteration, i.e. asset location can be done at native robot exploration speed, except for the initial signature configuration overhead. For data centers having 16,385 to 256M blade center chassis, two iterations may be required. In a similar fashion, more than 256M blade centers require three iterations, however this number of blade centers currently exceeds any practical data center size limit.

With the encoding signature embodiment, it should be appreciated that some consideration may be necessary for blade center chassis that are not fully populated with blades in all slots of the blade center. That is, if the blade center is not fully populated, all possible binary bit states may not be able to be represented, e.g., if a blade center chassis has 14 slots for blades, but only 7 of those slots are populated by blades, then rather than having the full 14 bit signature available, only a 7 bit signature is possible. Thus, the assignment of signatures to blade center chassis by the asset management system 150 takes into consideration the actual number and slot location of blades in each blade center chassis when determining what signatures are able to be represented by the visual output elements of the blades. For example, a signature that is capable of being represented by a 7 bit signature is assigned to blade center chassis having only 7 blades whereas signatures requiring the full 14 bits may be reserved for blade center chassis that are fully populated with blades. Hence, when doing the assignment of signatures, the asset management system 150 determines the possible signatures that the particular blade center chassis can manifest using its corresponding visual output elements of its blades and selects a signature from the subset of signatures matching the signatures able to be output by the visual output elements of the blades.

It should be appreciated that these processes may be performed repetitively to individually identify each IT asset that is associated with a discovered rack 120, 170. Moreover, this process may be repeated for each blade center chassis 120, 170 encountered by the automated robot 160 as it performs its operations within the premises of the distributed data processing system.

Figure 2:
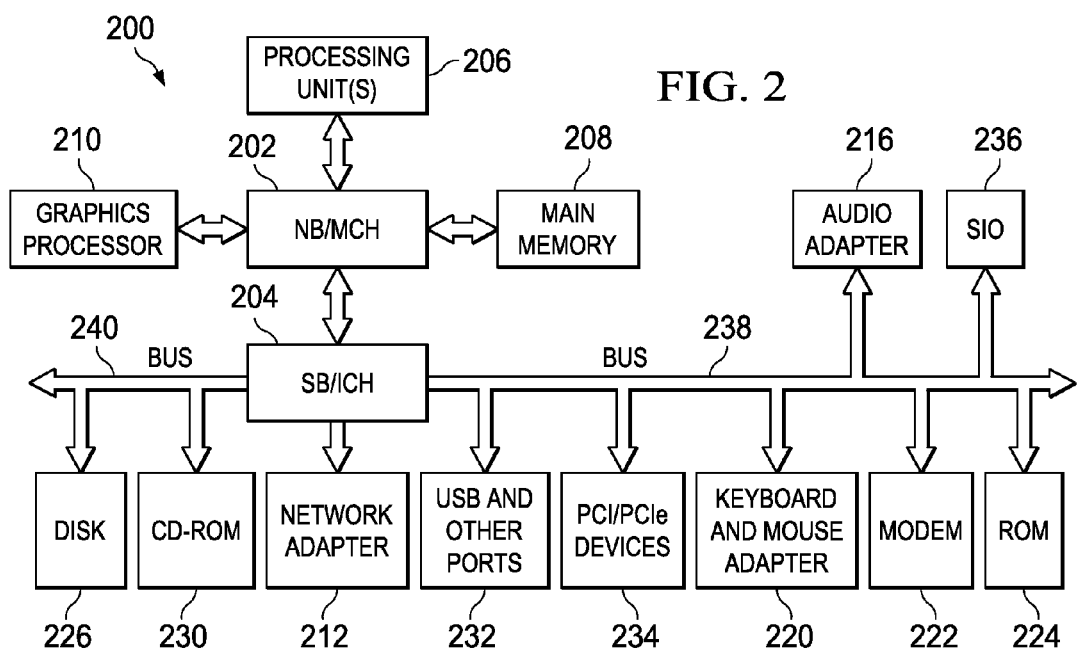
FIG. 2 is an example block diagram of a computing device in which aspects of the illustrative embodiments may be implemented.

FIG. 2 is a block diagram of an example data processing system in which aspects of the illustrative embodiments may be implemented. In particular, data processing system 200 is an example of a computing device that may be used to implement the asset management system 150 of FIG. 1, for example. In some illustrative embodiments, data processing system 200 may also, or alternatively, be provided in an automated robot to allow the automated robot to perform complex visual analysis as described above and hereafter. The data processing system 200 may comprise computer usable code or instructions implementing the processes for illustrative embodiments of the present invention which may be executed by the data processing system 200 to perform the various operations described hereafter with regard to the asset management computing system 150.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As mentioned above, the data processing system 200 may be employed to provide the hardware and software for implementing an asset management system, such as asset management system 150 in FIG. 1. The asset management system may communicate with IT assets and a mobile robot via one or more networks of a wired and/or wireless nature. In some illustrative embodiments, these IT assets comprise racks, blade center chassis, and blades within the blade center chassis, as previously described above.

Figure 3:
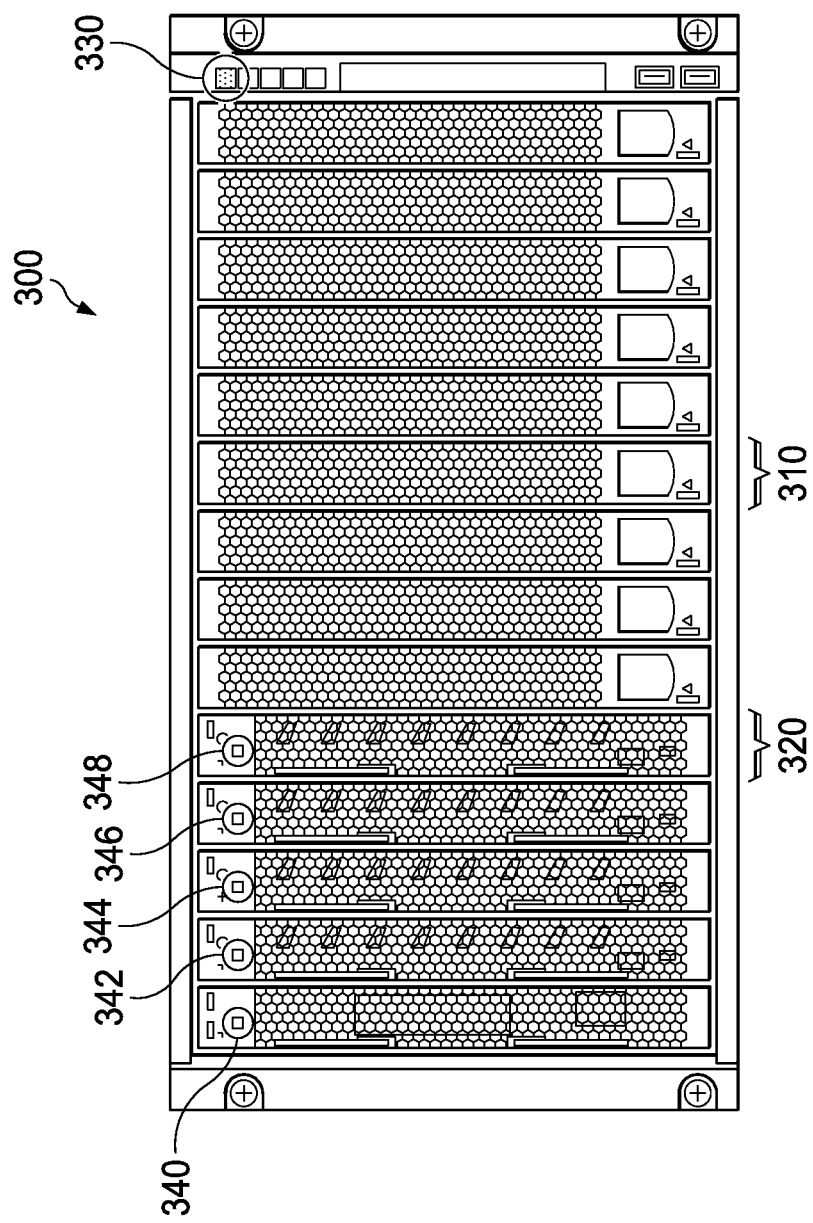
FIG. 3 is an example block diagram of a blade center in accordance with one illustrative embodiment.

FIG. 3 is an example diagram of a front face of a blade center chassis with which the mechanisms of the illustrative embodiments may be utilized. A blade center chassis is a physical enclosure for storing and managing one or more blades, or "blade servers." The blade center chassis 300 in FIG. 3 comprises a plurality of slots, or bays, 310 into which blades may be inserted. In the depicted example, the blade center chassis 300 comprises 14 slots 310 with only the left most 5 slots being occupied by actual blades 320. The blade center chassis 300 includes a visual output element 330, e.g., an LED, that indicates its operational status and which may be used by the mechanisms of the illustrative embodiments to orient the visual sensors/detectors of an automated robot when capturing images of the blade center chassis 300.

The blade center chassis 300 comprises circuitry and control logic for enabling the operation of the blades within the blade center chassis 300 including providing functionality for routing data to and from the various blades, controller operational characteristics of the blades (e.g., temperature, on/off status, and the like). In one illustrative embodiment, each blade center chassis has its own associated blade center management module (BCMM), such as BCMM 122 or 172, which is responsible for managing the operation of the various blades 320 in the blade center chassis 300. The BCMM communicates with an asset management system via one or more networks to obtain control communications from the asset management system and also to provide configuration information for the blade center chassis 300 to the asset management system.

Important to the functionality of the illustrative embodiments, each of the blades 320 in the blade center chassis 300 has a corresponding visual output element 340-348, e.g., an LED, which is typically used to locate the corresponding blade 320. The state of this LED may be controlled by the BCMM via control commands sent to the corresponding blade 320 so that the LED is placed into either an on or off state. The state of this LED may be identified by a visual detector/sensor, such as a digital camera or the like. As mentioned above, in one illustrative embodiment, a vision enabled automated robot may be equipped with one or more digital cameras that are able to be positioned such that an image/video of the front face of the blade center chassis 300 may be captured for analysis. Positioning or orienting of the one or more cameras may be achieved using the blade center location LED 330 as an orientation point.

With the mechanisms of the illustrative embodiments, the asset management system 150 in FIG. 1 may send control signals to a BCMM associated with the blade center chassis 300 to instruct the BCMM to control the output of the LEDs 340-348 of the blades in accordance with the implemented discovery methodology, e.g., binary search, digital signature output, or the like. As a result the LEDs 340-348 are turned on or off in accordance with the corresponding output pattern desired for the discovery methodology used. For example, with a digital signature discovery methodology, the BCMM may instruct the LEDs 340-348 to illuminate or not illuminate to thereby visually output a binary representation of a digital signature of the blade center chassis 300 stored in the BCMM as assigned to it from the asset management system 150, i.e. each LED will have a state of either on or off, where "on" represents a binary "1" value and "off" represents a binary "0" value, for example. With a binary search methodology, all of the LEDs 340-348 may be illuminated or not-illuminated in accordance with a series of iterations until a single blade center chassis of interest is identified within the rack.

The visual detector/sensor, such as may be attached to a visually enabled automated robot for example, may capture one or more images/video of the blade center chassis 300. The images/video thus captured may be filtered and analyzed by a computing system associated with the visual detector/sensor, such as in the automated robot for example, or in a remote computing system, such as asset analysis system 150 for example. For example, the images/video may be filtered for particular light color intensities in order to focus detection on the LEDs 340-348. If it is known that the LEDs 340-348 have a particular light color, then filtering of the images/video may be performed to eliminate other light colors so that analysis can focus on the state of the LEDs 340-348. The analysis may focus on a known location where these LEDs 340-348 should be present if a blade 320 is present in the corresponding slot of the blade center chassis 300.

Figure 4A:
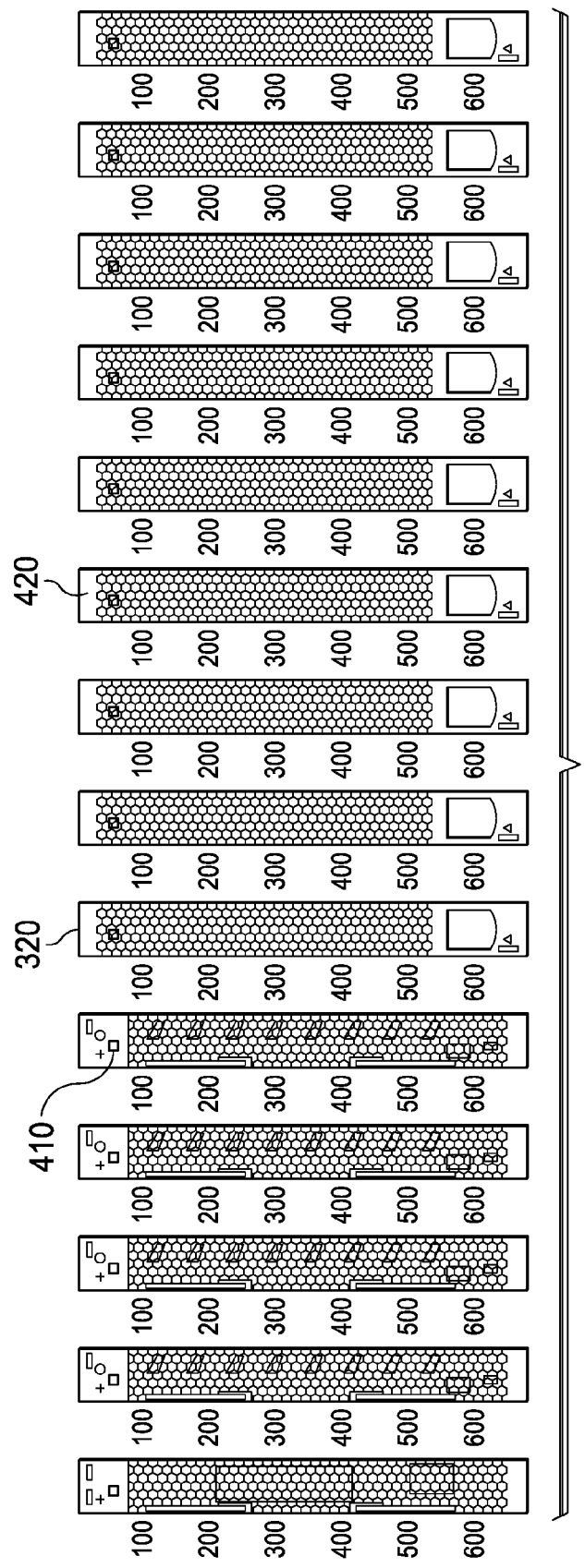
FIGS. 4A and 4B illustrate images of blades in a blade center captured by a visual sensor/detector and a filtered version of these images in accordance with one illustrative embodiment.
Figure 4B:
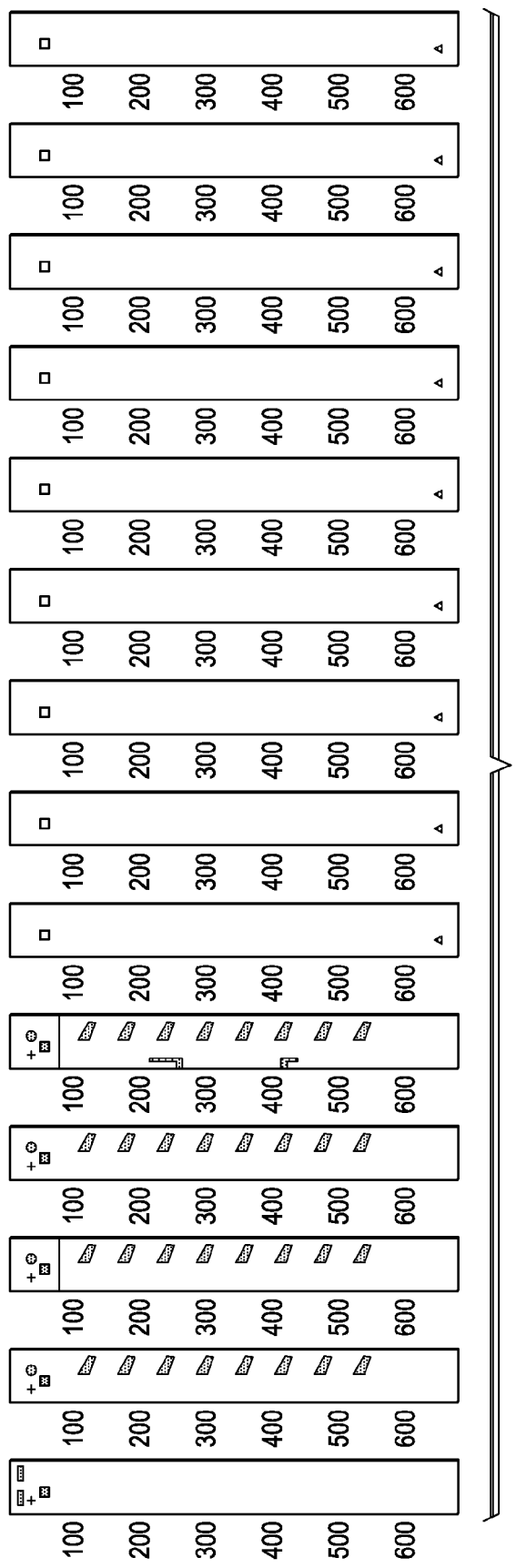

FIGS. 4A and 4B illustrate images of blades in a blade center chassis, such as blade center chassis 300 in FIG. 3, captured by a visual sensor/detector and a filtered version of these images in accordance with one illustrative embodiment. FIG. 4A corresponds to the image of blade center chassis 300 in FIG. 3 as may be captured by a digital camera or other visual sensor/detector. For ease of illustration, each blade 320 in the blade center chassis 300 is separated out into its own image within FIG. 4A. However, it should be appreciated that in actual implementations, these blades may not be separated out in this manner and analysis of the image as a whole may be performed.

As shown in FIG. 4A, the analysis mechanisms of the illustrative embodiments are configured to detect the presence of an LED at a predefined location on the blades 320, represented by element 410 in FIG. 4A which is positioned at a "0" vertical position. As such, since some of the slots, or bays, of the blade center chassis, do not contain a blade, e.g., slot 420, a LED is not present at this "0" vertical position for these slots. Thus, these positions cannot have an illuminated LED output that is detected by the visual sensor/detector. This is essentially a binary "0" output as detected by the visual sensor/detector. The slots or bays in which a blade 320 is present may have the state of their LEDs either on or off, illuminated or not illuminated.

FIG. 4B illustrates the same images of the blades 320 as shown in FIG. 4A but with filtering having been performed on these images to focus on the color of light emitted from the LEDs at the known location 410 of the blades 320. As can be seen from the filtered image of FIG. 4B, all details other than the color of light corresponding to the color of light emitted from the LEDs of the blades 320 are eliminated from these images. This filtering can be performed on raw image data captured by the visual detectors/sensors by filter software executed by a computing system associated with these visual detectors/sensors or at a remote location after the captured image data is transmitted to the computing system. In one illustrative embodiment, the filtering of the captured image/video data is performed by a computing system of a vision enabled automated robot prior to sending the filtered image/video data to the remote asset management system 150 for further analysis. Alternatively, all filtering and analysis may be performed at the vision enabled automated robot with results of such filtering and analysis being reported back to the asset management system.

By filtering the image of FIG. 4A to generate the filtered image of FIG. 4B, image analysis mechanisms may more easily identify the state of the LEDs as the known location of the blades to determine whether these LEDs are illuminated or not. From these states, a digital signature for the blade center chassis may be determined.

Figure 5A:
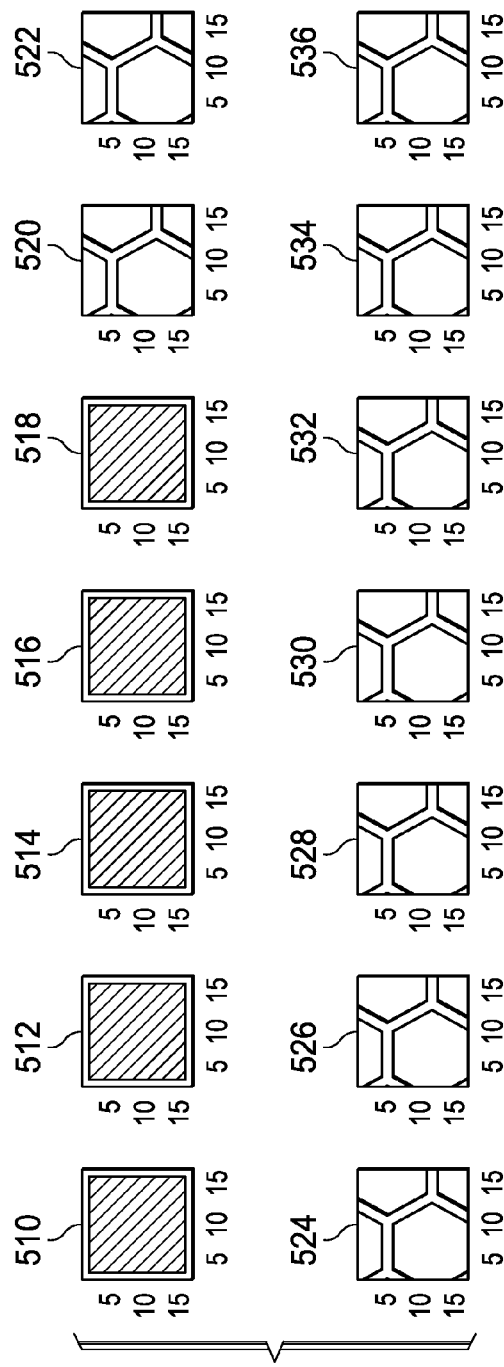
FIGS. 5A-5C illustrate a process of converting a captured image to a digital signature for a blade center in accordance with one illustrative embodiment.
Figure 5B:
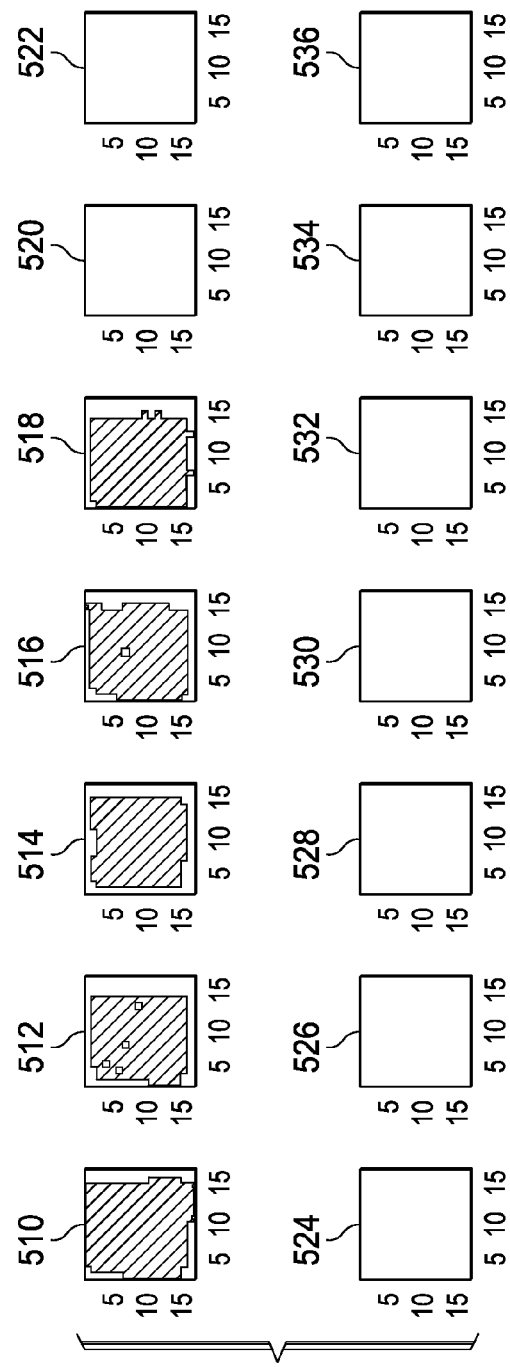
Figure 5C:
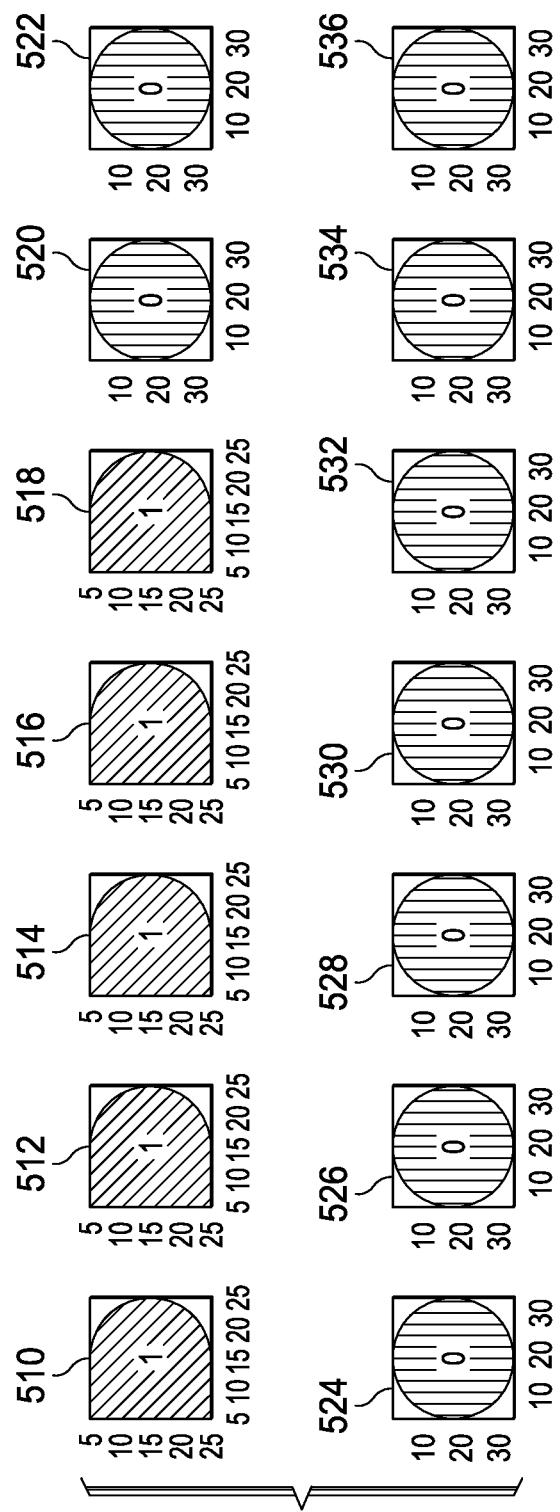

FIGS. 5A-5C illustrate a process of converting a captured image to a digital signature for a blade center chassis in accordance with one illustrative embodiment. FIG. 5A represents a blown up portion of the image shown in FIG. 4A focusing only on the portion of the blades known to be the correct location for the LEDs. As shown in FIG. 5A, in the raw image data captured by the visual detectors/sensors, the LEDs 510-518 have illuminated LEDs while the locations for the LEDs in blade slots 520-536 do not have illuminated LEDs and in fact simply have a grating of the slot/bay cover present where the LED would be present if a blade had been present.

Through filtering of the image in FIG. 5A, the filtered image of FIG. 5B is obtained which eliminates the grating details for slots/bays 520-536. As a result, each portion of the image 510-536 either registers a colored image or a non-colored image. This may be analyzed by the image analysis mechanisms of the illustrative embodiments to determine whether each portion 510-536 corresponds to a colored portion or a non-colored portion. As shown in FIG. 5C, colored portions are represented by the binary value "1" and non-colored portions 520-536 are represented by the binary value "0". In this example, this gives the digital signature "11111000000000" for the blade center.

This digital signature may be the actually uniquely assigned digital signature for the blade center chassis, or may be the illumination of LEDs as part of a binary search methodology. With the digital signature embodiment, the digital signature "11111000000000" gives a unique identity of the blade center chassis for the particular iteration of the discovery operation (remembering that for data centers having more than 16384 blade centers, 2 iterations may be necessary with reuse of digital signatures). This unique digital signature may be reported back to the asset management system along with the location of the blade center chassis within the data center where this digital signature is detected, which may correlate the digital signature with stored configuration information to identify the particular blade center chassis with which the digital signature is associated and retrieve the configuration of the blade center chassis including what blades are present in the blade center chassis and their configurations. This information may be used along with the location of the visual detector/sensor, e.g., the reported location of the vision enabled automated robot, within the premises of the organization, e.g., data center, so as to store the precise location of the rack, the blade center chassis within the rack, and the individual blades within the blade center chassis, in association with the configuration information for the blade center chassis and corresponding blades. As a result, the asset management system has a complete understanding of the location of the assets within the premises of the organization.

With a binary search methodology, the asset management system, through multiple iterations, narrows down the set of blade center chassis to which commands are sent to illuminate the LEDs on their blades. Since the asset management system is instructing the BCMMs of the blade center chassis that it is interested in, i.e. the asset management system sends a control signal to blade center chassis A, C, E, and G to illuminate their LEDs and thus, knows that if a blade center is detected as having its LEDs illuminated it must be within this set, it can determine the specific identity of the blade center chassis in the last iteration of the binary search.

For example, assume that through a discovery process of a vision enabled automated robot of a data center, that the robot detects the presence of a new blade center chassis in a rack at its current physical location and reports this information back to the asset management system. The asset management system may initiate the binary search operation to identify which blade center chassis this new blade center chassis is. The asset management system has a stored data structure identifying all of the BCMMs present in the data center. Thus, the asset management system will send out a signal to toggle on the LEDs of the blades of half of the blade center chassis in the data center while the other half remain off. The robot captures an image of the new blade center to determine if its LEDs are on or off. If the LEDs are on, then the asset management system knows that the new blade center chassis is within the subset of blade center chassis, whose LEDs were toggled on. If the LEDs are off, then the asset management system knows that the new blade center is within the subset of blade center chassis, whose LEDs were left off. The particular subset is then selected and the process is repeated with this subset being halved again. This process may be iteratively repeated until a single blade center chassis identity is identified which must correspond to the newly discovered blade center chassis. As a result, the location of the robot may be used to identify the location of the rack. The location within the rack of the blade center chassis may be determined from analysis of the captured image, e.g., the vertical position the blade center chassis occupies in the rack, and the location of the blades within the blade center chassis as identified by configuration information communicated to the asset management system by the BCMM is determined.

Thus, the mechanisms of the illustrative embodiments provide an automated way of identifying the location of physical assets, such as racks, blade center chassis, and individual blades, within the physical premises of an organization. The mechanisms of the illustrative embodiments leverage the visual output hardware already present in these physical assets to provide an indicator of the location of the physical asset as well as its particular identity. The mechanisms of the illustrative embodiments may make use of automated robotic mechanisms already utilized in such organizations to perform such automated identification of physical assets using new control and analysis mechanisms and methodologies. The illustrative embodiments thus allow an asset management system to automatically obtain and maintain detailed location information for the physical assets of an organization for use in performing management operations.

Figure 6:
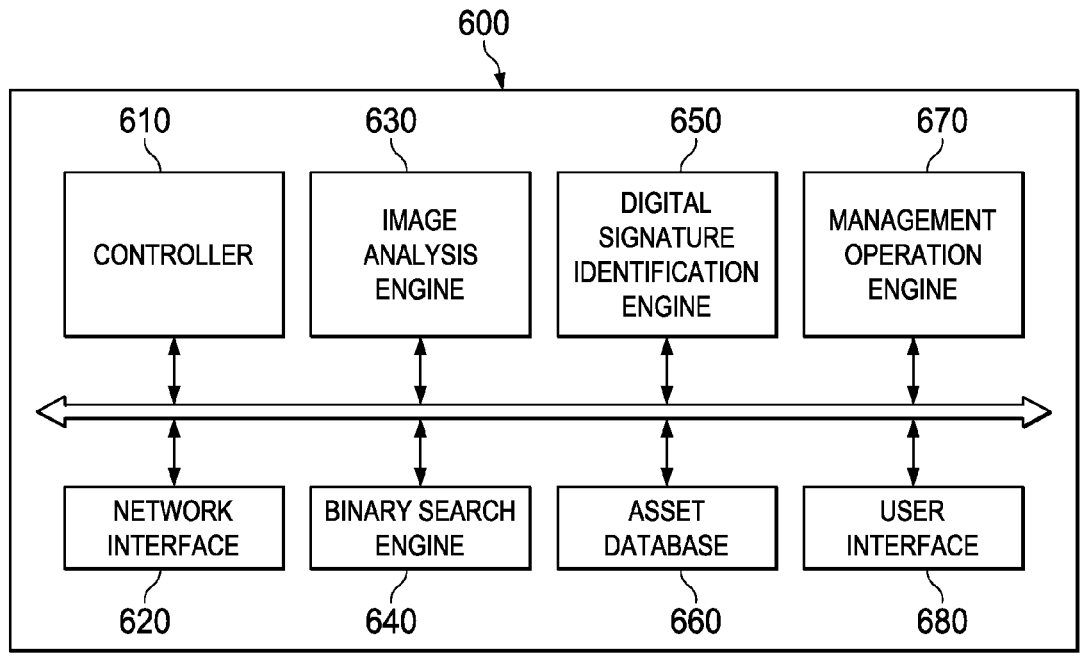
FIG. 6 is an example block diagram of an asset management system in accordance with one illustrative embodiment.

FIG. 6 is an example block diagram of an asset management system in accordance with one illustrative embodiment. The elements shown in FIG. 6 may be implemented in hardware, software, or any combination of hardware and software. In one illustrative embodiment, the elements of FIG. 6 are implemented as software instructions loaded into one or more memories and executed by one or more processors of the asset management system 600. The elements shown in FIG. 6 are only exemplary and other standard elements of a computing system, not specifically shown, may also be part of the asset management system without departing from the spirit and scope of the illustrative embodiments.

As shown in FIG. 6, the asset management system 600, which may be asset management system 150 in FIG. 1, for example, comprises a controller 610, a network interface 620, an image analysis engine 630, a binary search engine 640, a digital signature identification engine 650, and asset database 660, a management operation engine 670, and a user interface 680. The controller 610 controls the overall operation of the asset management system 600 and orchestrates the operation of the other elements 620-680. The network interface 620 provides a data communication pathway through which control commands and data may be transmitted to remotely located computing devices, such as BCMMs of blade center chassis, the vision enabled automated robot, or the like. The network interface 620 further provides a data communication pathway through which data may be received by the asset management system 600 from such remotely located computing devices. The network interface 620 may comprise wired, wireless, or a combination of wired and wireless communication interfaces for communicating with remotely located computing devices.

The image analysis engine 630 comprises logic for analyzing images captured by a visual detector/sensor, and received via the network interface 620, to determine the state of visual output devices associated with assets present in the captured images. The received captured images may be raw captured image data or already filtered image data depending upon the particular selected embodiment. Such analysis may comprise detecting of particular colors within the captured images at known locations as previously described, or any other generally known image analysis techniques capable of identifying the state of visual output devices associated with physical assets. In some embodiments, the image analysis engine 630 may perform pre-filtering of raw captured images received via the network interface 620 prior to performing image analysis on the filtered results. The results of the analysis performed by the analysis engine 630 may be presented to the binary search engine 640 and/or digital signature identification engine 650 for use in performing identification of a physical asset.

It should be appreciated that while both a binary search engine 640 and a digital signature identification engine 650 are shown in FIG. 6, both are not required and in many embodiments only one or the other may actually be present in the asset management system depending on the particular implementation chosen. The binary search engine 640 comprises logic for performing a binary search of physical assets so as to uniquely identify the particular asset at a particular location that is the focus of a captured image. The digital signature identification engine 650 comprises logic for performing an identification of digital signatures detected in a captured image. This logic may assign digital signatures to assets, determine what digital signatures are output by assets whose image is captured in the captured image received via the network interface 620, and correlate these detected digital signatures with the assigned digital signatures to uniquely identify the asset(s) that is/are the focus of the captured image. Both of these engines 640 and 650 may interface with the image analysis engine 630 to obtain results of the image analysis to determine the content of the captured images for purposes of performing their operations, e.g., binary search or digital signature identification.

The asset database 660 stores information about each of the physical assets present in the organization, e.g., a data center or the like. This information may be communicated to the asset management system from management modules, e.g., BCMMs, associated with the physical assets and may include configuration information that may be used for managing the assets. This information may be augmented with specific physical location information obtained and detected using the automated mechanisms of the illustrative embodiments. The asset database 660 may be used by the engines 640-650 when performing their identification operations. In one example, the asset database 660 may identify, for each asset, how many slots or bays of the asset are occupied so that the digital signature identification engine 650 may consider the visual output possibilities for the asset when assigning a digital signature to the asset, for example.

The management operation engine 670 comprises logic for managing the various assets of the organization based on the information maintained in the asset database 660. Such management operations may be based at least partly upon the physical location of the asset as determined through the automated mechanisms of the illustrative embodiments. Examples of such management operations may include hardware upgrades, hardware maintenance, troubleshooting, failure recovery, decommission of hardware, topology-dependent dynamic management techniques such as reallocating workloads across a data center for improving data center energy and thermal characteristics, or the like. The management operation engine 670 may provide an output to human system administrators or the like via the user interface 680 which may provide visual, audible, and even tactile outputs to inform a system administrator of a management operation, a state of the assets within the organization, a map of the physical location of the assets within the organization as determined from the automated mechanisms of the illustrative embodiments, or the like.

Figure 7:
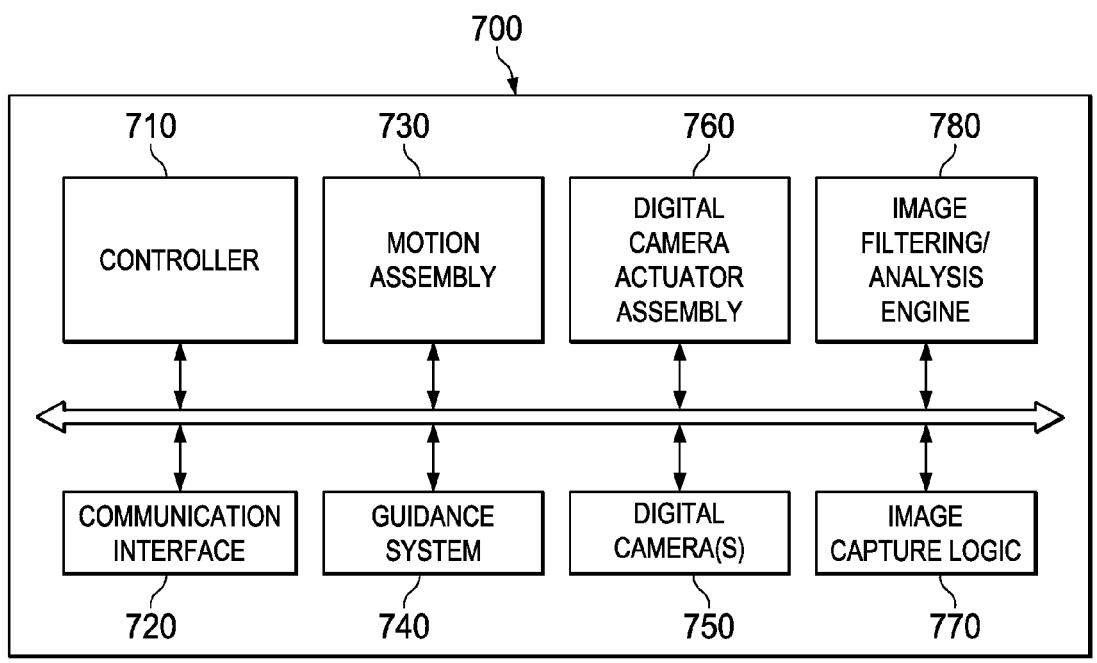
FIG. 7 is an example block diagram of a vision enabled automated robot in accordance with one illustrative embodiment.

FIG. 7 is an example block diagram of a vision enabled automated robot in accordance with one illustrative embodiment. Various ones of the elements shown in FIG. 7 may be implemented in hardware, software, or any combination of hardware and software. For example, the digital camera(s) 750 and actuator assembly 760 may be provide as hardware elements with circuitry and embedded software, such as in the form of firmware. Controller 710, wireless communication interface, guidance system 740, image capture logic 770, and image filtering/analysis logic 780 may be implemented as software instructions loaded into one or more memories, or stored as firmware, and executed by one or more processors. Other elements not explicitly shown in FIG. 7 may also be part of the vision enabled automated robot 700 without departing from the spirit and scope of the present invention.

As shown in FIG. 7, the vision enabled automated robot 700 comprises a controller 710, a wireless communication interface 720, a motion assembly 730, a guidance system 740, one or more digital cameras 750, a digital camera actuator assembly 760, image capture logic 770, and image filtering/analysis logic 780. The controller 710 provides logic for controlling the overall operation of the vision enabled automated robot 700 and orchestrating the operation of the other depicted elements. Wireless communication interface 720 provides a wireless communication pathway through which data, commands, and instructions may be transmitted and received to/from remotely located computing devices via a wireless network. In one illustrative embodiment, wireless communication interface 720 may also comprise a short distance, or local, communication protocol interface, such as Bluetooth, infrared, or the like, through which communication may be made with physical assets directly by the vision enabled automated robot 700. This may be useful, for example, in embodiments where the asset management system utilizes the vision enable automated robot 700 as an interface between the asset management system and the physical assets themselves.

The motion assembly 730 is responsible for physically moving the robot 700 through the premises of the organization. As such, the motion assembly 730 may comprise a motor, wheels or tracks, drive trains, or any other generally known elements for physically moving a robot through a physical area.

The guidance system 740 provides logic for determining the particular location of the robot 700 and identifying objects in its surroundings. Thus, the guidance system 740 may make use of any known location determination mechanism, such as a Global Positioning System (GPS), a location triangulation mechanism, or the like. Moreover, the guidance system 740 may comprise object detection mechanisms for detecting objects within the robot's surroundings for purposes of navigating around such objects. With particular emphasis for the present illustrative embodiments, the guidance system 740 provides a location of the robot which may be communicated to an asset management system and used to identify the particular asset location as previously described above.

The one or more digital cameras 750 are used to capture images/video of physical assets for use in performing asset identification and location in accordance with the illustrative embodiments as previously described. The one or more digital cameras 750 may be associated with an actuator assembly 760 for orienting the one or more digital cameras 750 so as to capture desired images/video of the visual output elements of physical assets. For example, in one illustrative embodiment, the digital camera 750 may be mounted on a vertical column and the actuator assembly 760 may be used to move the digital camera 750 up and down the vertical column to position the digital camera 750 in front of the assets at various elevations so as to capture images of the individual assets and their associated visual output element states.

The image capture logic 770 comprises logic for controlling the capturing of images/video for analysis. The image capture logic 770 may work in conjunction with the controller 710, the digital camera 750, the actuator assembly 760, and the like to position the digital camera 750 at an appropriate position for capturing a desired image and controlling these elements to perform the actual image capture operation.

The image filtering/analysis logic 780 comprises logic for filtering the captured images/video to focus analysis of the captured images/video on the state of the visual output elements of the physical assets. The image filtering/analysis logic 780 may, in some embodiments, include logic for performing the complex analysis of the captured images/video to identify the particular asset digital signature for communication back to the asset management system such that rather than transmitted image data back to the asset management system, a binary representation of the digital signature is returned. In other illustrative embodiments, the image filtering/analysis logic 780 may be eliminated from the robot 700 entirely with such functionality being provided in the asset management system based on raw captured image data that is transmitted from the robot 700 to the asset management system.

Figure 8:
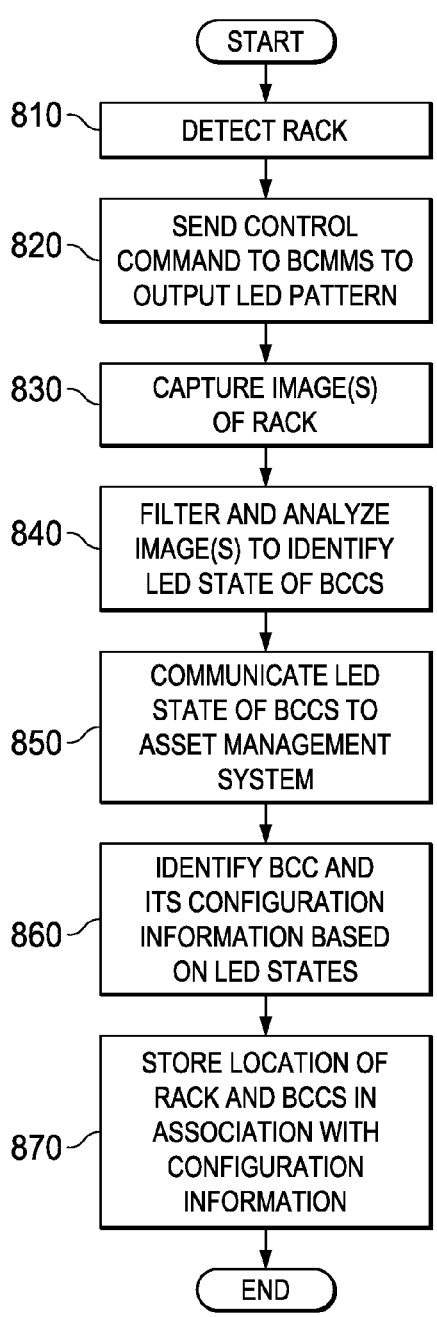
FIG. 8 is a flowchart outlining an example operation for identifying a blade center and blades within the blade center in accordance with one illustrative embodiment.

FIG. 8 is a flowchart outlining an example operation for identifying a blade center chassis and blades within the blade center chassis in accordance with one illustrative embodiment. As shown in FIG. 8, the operation starts with receiving an indication from an automated visual sensor/detector platform, e.g., vision enabled automated robot, that it has detected the presence of a rack at its current location (step 810). The asset management system sends a control command to all of a selected group of BCMMs of the organization to output a pattern on the LEDs of the blades of their corresponding blade centers (step 820). The visual sensor/detector captures an image/video of the rack (step 830). The captured image is filtered and analyzed to determine the state of the LEDs of the blade center chassis present in the rack to generate a captured pattern of LED output for each of blade center chassis in the rack(step 840). The states of the LEDs in each of the captured patterns are communicated back to the asset management system (step 850).

The states of the LEDs for each of the blade center chassis are used to identify the corresponding blade center and its stored configuration information (step 860). This may involve an iterative binary search operation or a digital signature identification operation as described above and in FIGS. 9 and 10 hereafter, for example. The identification of the blade center chassis, their position within the captured image with regard to a vertical position within the rack, and the location of the visual sensor/detector platform are correlated and stored in an asset database (step 870). Thus, as a result, a mapping of the organization layout, to individual racks, to individual blade center chassis, and to individual blades is made possible.

Figure 9:
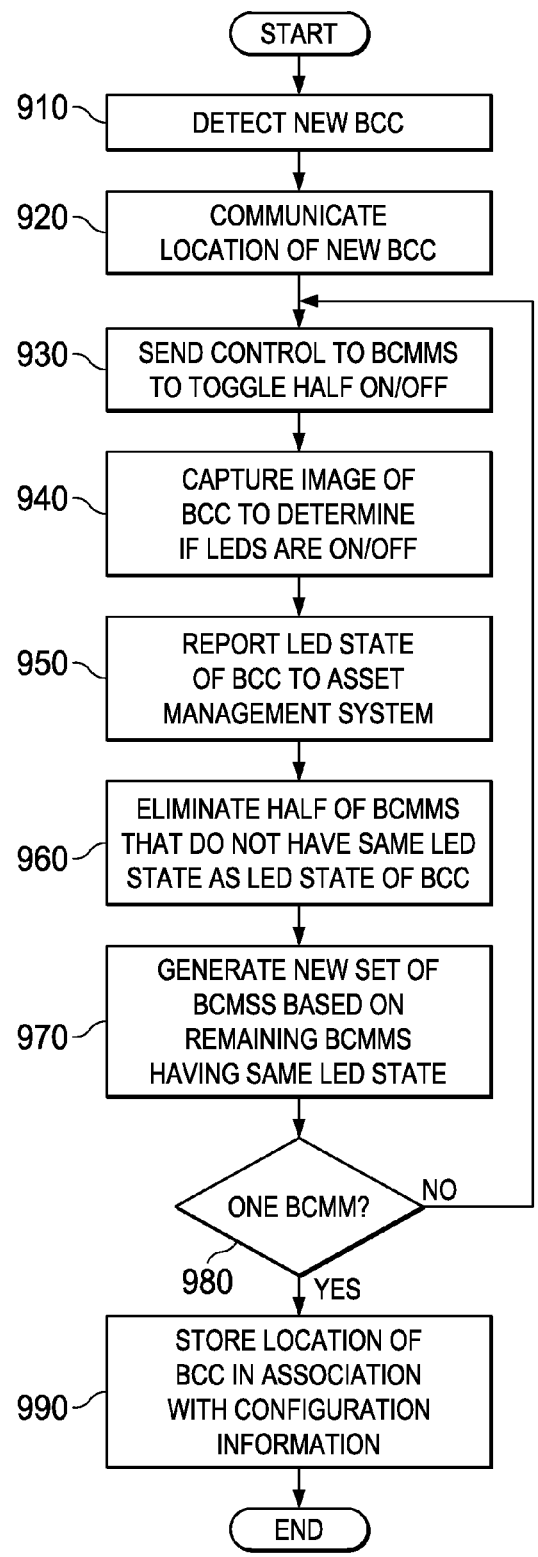
FIG. 9 is a flowchart outlining an example operation for identifying a blade center using a binary search methodology in accordance with one illustrative embodiment.

FIG. 9 is a flowchart outlining an example operation for identifying a blade center chassis using a binary search methodology in accordance with one illustrative embodiment. As shown in FIG. 9, the operation starts by a visual sensor/detector platform, e.g., vision enabled automated robot, identifying a new blade center chassis during its exploration of the data center (step 910). The visual sensor/detector platform communicates to the asset management system its location and thus, the location of the new blade center chassis (step 920). The asset management system sends control signals to the BCMMs of the blade center chassis in the data center to toggle half of the BCMMs of the set of blade center chassis to an "on" LED state with the other half remaining turned "off" (step 930). The visual sensor/detector platform captures an image of the target blade center chassis and determines if its LED state is on or off (step 940). The visual sensor/detector platform reports the discovered blade center LED state to the asset management system (step 950). The asset management system eliminates the set of blade center chassis that were not in the state corresponding to the discovered state of the blade center chassis, e.g., if the discovered blade center LED state is on, the blade center chassis in the half of blade centers whose LED state is off are eliminated from consideration (step 960). A new set of blade center chassis is generated based on the remaining half of the blade center chassis having an LED state corresponding to the detected LED state of the discovered blade center chassis (step 970).

A determination is made as to whether this new set comprises a single blade center chassis (step 980). If not, the operation returns to step 930. If the new set contains a single blade center chassis, then this is determined to be the identity of the discovered blade center chassis and the location of this blade center chassis is stored in association with the identity and configuration information for this blade center chassis (step 990). The operation then terminates.

Figure 10:
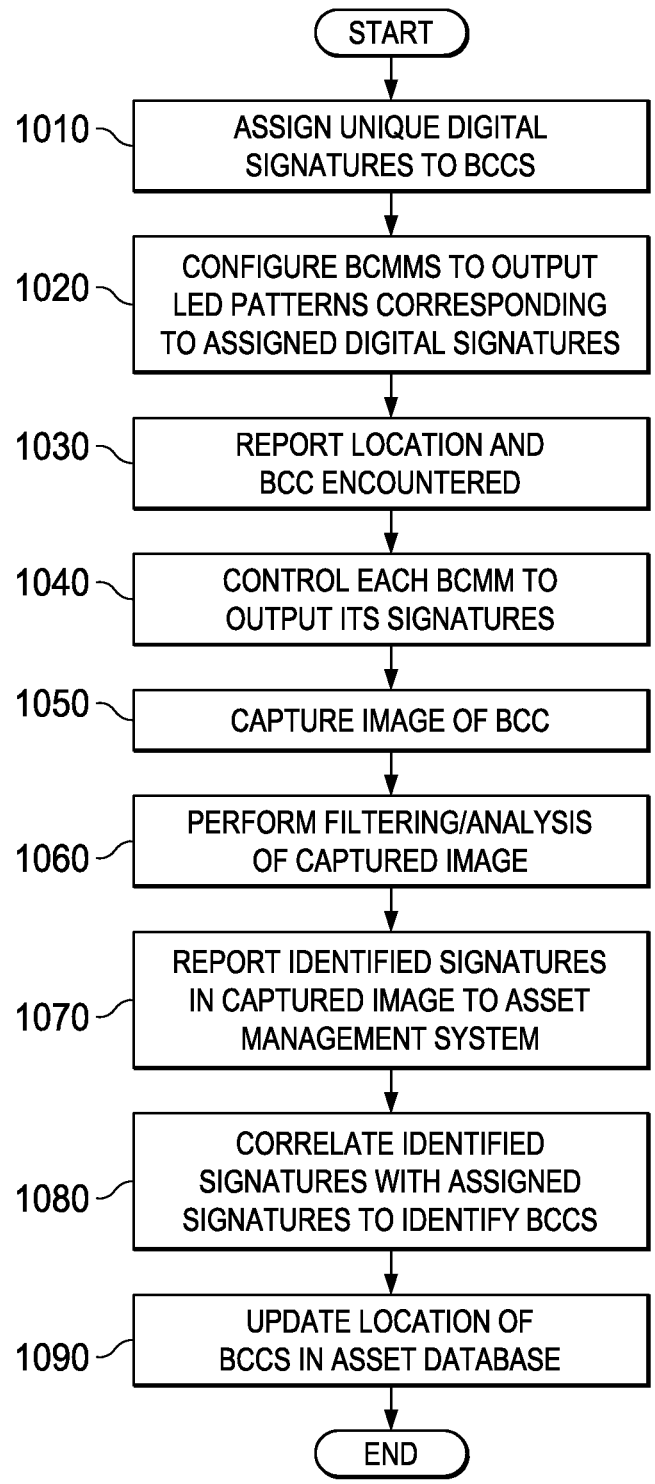
FIG. 10 is a flowchart outlining an example operation for identifying a blade center using a digital signature methodology in accordance with one illustrative embodiment.

FIG. 10 is a flowchart outlining an example operation for identifying a blade center chassis using a digital signature methodology in accordance with one illustrative embodiment. As shown in FIG. 10, the operation starts with the asset management system assigning unique digital signatures to each of the blade center chassis of a data center (step 1010). The BCMMs of the blade center chassis are configured to control the output of the LEDs of their corresponding blades to output the assigned digital signature in response to a command from the asset management system (step 1020). The visual sensor/detector platform, e.g., vision enabled automated robot, reports its current location and that it has encountered a rack during its exploration of the data center (step 1030). The asset management system sends a control signal to each of the BCMMs of the blade center chassis in the data center instructing them to output their digital signature (step 1040). The visual sensor/detector platform captures an image of the rack at its current location (step 1050), performs filtering and analysis of the captured image (step 1060), and reports the one or more digital signatures identified in the captured image back to the asset management system (1070). The asset management system correlates the captured digital signature(s) with stored digital signatures to identify the blade center chassis in the rack at the visual sensor/detector platform's current location (step 1080). The location of these blade center chassis is then updated in the asset database (step 1090) and the operation terminates.

Thus, the illustrative embodiments provide mechanisms for automatically identifying the physical location of physical assets within an organization. The illustrative embodiments eliminate the overhead and potential errors associated with human based mechanisms for identifying physical assets and provide a mechanism for keeping location information up-to-date on a more regular basis as a result.

The above illustrative embodiments have been described in terms of automated robotic mechanisms that have vision enablement, such as via mounted or integrated digital cameras and associated pattern recognition software. However, it should be appreciated that similar abilities to identify the location of physical assets may be achieved using non-robotic and even non-automated mechanisms. That is, in other illustrative embodiments, portable digital camera devices or other portable visual detectors/sensors may be used without departing from the spirit and scope of the illustrative embodiments. For example, the mechanisms of the illustrative embodiments may utilize digital cameras integrated with hardware carried by human technicians or other authorized personnel, such as in mobile telephones, tablet computing devices, or other portable computing devices carried by such authorized personnel. As such, the robot referred to in the above illustrative embodiments may be replaced with a human operator and control signals may be transmitted to the portable equipment handled by the human operator with corresponding messages output to the human operator to assist in performance of the image capture and analysis of the illustrative embodiments.

In other illustrative embodiments, stationary cameras and visual detectors/sensors may be utilized to achieve the image capture of the illustrative embodiments. For example, security cameras or the like, which may be mounted to walls or physical structures of the organization's premises may be used to capture the images for use by the mechanisms of the illustrative embodiments. Any mechanism for capturing the images/videos that are analyzed in the manner previously described may be used without departing from the spirit and scope of the illustrative embodiments.

Moreover, while the above illustrative embodiments are described in terms of an visual output elements, e.g., LED or the like, being either in an illuminated state or non-illuminated state and this being an indicator of a bit setting to either "0" or "1", the illustrative embodiments are not limited to such. Rather any distinguishable state may be used for visually representing the digital signature or identity of the physical asset. For example, different colors of light may be output, different effects, e.g., blinking, or the like may be used. In one illustrative embodiment, rather than using all of the LEDs of the blades to output the digital signature, a single LED, such as the LED associated with the blade center, may be used to output the signature through a series of blinking operations or other pattern detected over a predetermined period of time.

As previously mentioned above, the present invention is not limited to the identification of the location of blade center chassis, blades, and racks, or even to IT assets, but may be implemented to identify the physical location of any physical asset that has visual indicators that may be controlled to facilitate a binary search, unique signature search, or other search methodology based on the detection of visual indicators by a detector, such as a vision enabled automated robot, or the like. Examples of such physical assets may include storage and network equipment, rack-mounted servers, office space equipment, or other facilities equipments such as power supplies, cooling units, and the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining the physical location of a physical asset in a physical area, comprising:
   controlling a plurality of physical assets to cause each physical asset to output a visual output pattern on one or more visual output elements of the physical asset;
   capturing at least one image of a target physical asset using an image capture device, wherein the at least one image comprises a current state of the one or more visual output elements of the target physical asset, wherein the image capture device is a mobile image capture device whose physical location is not fixed;
   determining an identification of the target physical asset based on the current state of the one or more visual output elements of the target physical asset;
   determining a physical location of the target physical asset based on a physical location of the image capture device when the at least one image of the target physical asset was captured; and
   storing location data identifying the determined physical location of the target physical asset in an asset database in association with configuration information for the physical asset.

2. The method of claim 1, wherein controlling the plurality of physical assets comprises controlling each of the physical assets to either turn on or turn off the one or more visual output elements of the physical asset according to a binary search operation.

3. A method, in a data processing system, for determining the physical location of a physical asset in a physical area, comprising:

controlling a plurality of physical assets to cause each physical asset to output a visual output pattern on one or more visual output elements of the physical asset;

capturing at least one image of a target physical asset using an image capture device, wherein the at least one image comprises a current state of the one or more visual output elements of the target physical asset;

determining an identification of the target physical asset based on the current state of the one or more visual output elements of the target physical asset;

determining a physical location of the target physical asset based on a physical location of the image capture device when the at least one image of the target physical asset was captured; and storing location data identifying the determined physical location of the target physical asset in an asset database in association with configuration information for the physical asset, wherein determining an identification of the target physical asset based on the current state of the one or more visual output elements of the target physical asset comprises executing a binary search operation in which, in each iteration of the binary search operation, a first subset of the plurality of physical assets are controlled to have their one or more visual output elements turned on and a second subset of the plurality of physical assets are controlled to have their one or more visual output elements turned off, and wherein during each iteration, one of the first subset or the second subset is selected to be the plurality of physical assets for a next iteration of the binary search operation.

4. A method, in a data processing system, for determining the physical location of a physical asset in a physical area, comprising:

controlling a plurality of physical assets to cause each physical asset to output a visual output pattern on one or more visual output elements of the physical asset;

capturing at least one image of a target physical asset using an image capture device, wherein the at least one image comprises a current state of the one or more visual output elements of the target physical asset;

determing an identification of the target physical asset based on the current state of the one or more visual output elements of the target physical asset;

determining a physical location of physical asset based on a physical location of the image capture device when the at least one image of the target physical asset was captured; and storing location data identifying the determined physical location of the target physical asset in an asset database in association with configuration information for the physical asset, wherein controlling the plurality of physical assets comprises controlling each of the physical assets to cause the physical asset to output an assigned signature using the one or more visual output elements of the physical asset, and wherein determining an identification of the target physical asset based on the current state of the one or more visual output elements of the target physical asset comprises detecting the signature output by the one or more visual output elements of the target physical asset and correlating the detected signature with an identifier of the physical asset.

5. The method of claim 1, wherein capturing at least one image of a target physical asset using an image capture device comprises capturing the at least one image with an image capture device coupled to an automated robot that moves through the physical area.

6. The method of claim 5, wherein determining a physical location of the target physical asset based on a physical location of the image capture device when the at least one image of the target physical asset was captured comprises:

determining a physical location of an enclosure of the target physical asset based on a physical location of the automated robot when the at least one image of the target physical asset was captured; and determining a physical location of the target physical asset within the enclosure based on analysis of the at least one image.

7. The method of claim 1, wherein capturing at least one image of a target physical asset using an image capture device comprises capturing the at least one image using an image capture device coupled to hardware carried by a human being.

8. The method of claim 7, wherein the hardware comprises at least one of a mobile telephone, a tablet computing device, or a portable computing devices.

9. The method of claim 1, wherein each of the physical assets in the plurality of physical assets are blade center chassis in a rack, and wherein the one or more visual output elements are light emitting diodes (LEDs) of blades in the blade center chassis.

10. The method of claim 9, wherein controlling the plurality of physical assets to cause each physical asset to output the visual output pattern on one or more visual output elements of the physical asset comprises sending control signals to blade center management modules associated with each of the blade center chassis instructing the blade center chassis to control the LEDs of the blades of the blade center chassis.

11. The method of claim 9, wherein determining an identification of the target physical asset based on the current state of the one or more visual output elements of the target physical asset comprises:

determining a physical location of a rack in which the target blade center chassis is located based on a physical location of an automated robot, to which the image capture device is coupled, when the at least one image of the target blade center chassis was captured;

determining a physical location of the target blade center chassis within the rack based on analysis of the at least one image; and determining the blades in the target blade center chassis based on configuration information associated with the target blade center chassis.

12. The method of claim 9, wherein each of the blade center chassis is assigned a unique signature, and wherein controlling a plurality of physical assets to cause each physical asset to output a visual output pattern on one or more visual output elements of the physical asset comprises sending control signals to blade center management modules (BCMMs) associated with the blade center chassis to instruct each of the BCMMs to control an associated blade center chassis to output the blade center chassis assigned unique signature using the light emitting diodes (LEDs) of blades in the blade center chassis.

13. The method of claim 12, wherein the assigned unique signature is a digital signature comprising a plurality of bits having either a logical 1 or logical 0 setting, and wherein the BCMMs control the associated blade center chassis to output the unique signature using the LEDs of blades in the blade center chassis by either turning on or turning off individual LEDs to generate the digital signature where a LED turned on corresponds to a logical 1 and a LED turned off corresponds to a logical 0.

14. The method of claim 1, further comprising:
performing one or more asset management operations on the target physical asset based on the stored location data associated with the target physical asset.

15. The method of claim 9, wherein the LEDs of the blades in the blade center chassis comprise a single LED for each blade in the blade center chassis at a predetermined location of the blade relative to a reference point of the blade center chassis, and wherein a combination of LEDs across the blades of the blade center chassis are controlled to output, through turning off or turning on corresponding ones of the single LEDs of the blades, a binary digital signature previously assigned to the blade center chassis by a controller, where an LED turned off represents a binary 0 value and an LED turned on represents a binary 1 value.

16. The method of claim 15, wherein the binary digital signature is assigned to the blade center chassis by the controller based on a number of blades present in the blade center chassis and a corresponding capability for representing a binary digital value based on the number of single LEDs of the blades in the blade center chassis.

17. The method of claim 4, wherein the signature output by the one or more visual output elements of the target physical asset and the correlated identifier of the physical asset are unique to the physical asset such that the signature and identifier uniquely identify the physical asset from amongst the plurality of physical assets.

* * * * *